US007047609B2

(12) United States Patent
Hu et al.

(10) Patent No.: US 7,047,609 B2
(45) Date of Patent: May 23, 2006

(54) EXTRACTOR STRUCTURE

(76) Inventors: Chih Kuo Hu, No.28, Lane 237, Wucyuan 5th St., West District, Taichung City 403 (TW); Sen Jung Liu, No.28, Lane 237, Wucyuan 5th St., West District,Taichung City 403 (TW)

( * ) Notice: Subject to any disclaimer, the term of this patent is extended or adjusted under 35 U.S.C. 154(b) by 14 days.

(21) Appl. No.: 10/998,613

(22) Filed: Nov. 30, 2004

(65) Prior Publication Data

US 2005/0229373 A1 Oct. 20, 2005

(51) Int. Cl.
*B23P 19/04* (2006.01)

(52) U.S. Cl. ........................................................ 29/261

(58) Field of Classification Search .................. 29/261, 29/262, 259, 260, 246

See application file for complete search history.

(56) References Cited

U.S. PATENT DOCUMENTS 1,043,400 A * 11/1912 Collison ...................... 29/261
1,552,616 A * 9/1925 Kister ......................... 29/261

* cited by examiner

*Primary Examiner*—Robert C. Watson
(74) *Attorney, Agent, or Firm*—Rosenberg, Klein & Lee

(57) ABSTRACT

An extractor structure including a thread rod, a driving unit and an activating unit. A differential nut is rotatably disposed in the driving unit. The thread rod is screwed through the differential nut. The driving unit has several extension arms. The activating unit is disposed under the driving unit and includes a threaded seat and a connecting seat. The connecting seat is pivotally connected with the extension arms of the driving unit. The thread rod is screwed through the threaded seat. The threaded seat has several outward extending fixing arms interlaced with the extension arms of the driving unit. An outer end of each fixing arm is pivotally connected with a claw. An activating arm is pivotally connected with a middle section of the claw and pivotally connected with each connecting arm of the connecting seat. By means of adjusting the thread rod to push the work piece and further screwing the differential nut, the driving unit is operated up and down to make the activating unit open or close the claws for grasping the work piece.

5 Claims, 8 Drawing Sheets

EXTRACTOR STRUCTURE

BACKGROUND OF THE INVENTION

The present invention is related to an improved extractor structure, and more particularly to an extractor in which the claws can be easily opened/closed without deflection so as to truly grasp a work piece.

FIGS. 6 and 7 show a conventional complex extractor including a thread rod 51, a connecting seat 52, a pressboard seat 53, a spring 54 and a nut 55. The connecting seat 52 has an upward extending thread column 521 at the center. The pressboard seat 53 is formed with a central through hole 531 for the thread column 521 of the connecting seat 52 to pass through. The spring 54 is fitted around one end of the thread column 521 distal from the connecting seat 52. The nut 55 is screwed on the thread column 521 above the spring 54. The thread column 521 is formed with a central thread hole 522 through which the thread rod 51 is screwed. Several rotary arms 523 extend from the circumference of the connecting seat 52. Several grasping legs 524 are pivotally connected with the rotary arms 523. Several pressboards 532 extend from the circumference of the pressboard seat 53 corresponding to the rotary arms 523 of the connecting seat 52. The pressboards 532 serve to press the pivoted ends of the grasping legs 524. By means of adjusting the nut 55, the pressboard seat 53 can be moved up and down to press the pivoted ends of the grasping legs 524 so as to open or close the grasping legs 524 for holding a work piece.

When the nut 55 is screwed downward to push the pressboard seat 53, the action force can be hardly evenly distributed over the respective pressboards 532. Therefore, the grasping legs 524 cannot be accurately opened for truly grasping the work piece. It often takes place that one of the grasping legs 524 fails to truly operate. The spring 54 is compressed between the nut 55 and the pressboard seat 53. It is hard to prevent the pressboards 532 from being biased. As a result, only some of the grasping legs 524 can truly operate to grasp the work piece. Therefore, it often takes place that the extractor is detached from the work piece to lead to injury of a worker.

FIG. 8 shows an improved link-type extractor for overcoming the above problem. Such extractor includes a thread rod 6, a driving unit 7 and a driven unit 8. The driving unit 7 is formed with a central through hole 71. The driven unit 8 has a thread column 81 upward extending from the center of the driven unit 8 corresponding to the through hole 71 of the driving unit 7. An adjustment nut 83 is screwed on upper section of the thread column 81. The thread column 81 is formed with a central thread hole 811 through which the thread rod 6 is screwed. Several corresponding support arms 72, 82 extend from the circumferences of the driving unit 7 and the driven unit 8. The length of the support arm 72 of the driving unit 7 is larger than the length of the support arm 82 of the driven unit 8. The support arm 72 of the driving unit 7 is pivotally connected with one end of a claw 73. The driven unit 8 is pivotally connected with one end of a driven arm 84. A middle section of the claw 73 is pivotally connected with the other end of the driven arm 84. By means of adjusting the adjustment nut 83, the driving unit 7 is moved up and down to control the operation of the respective driven arm 84. Accordingly, the driven unit 8 can be operated to open or close the claws 73 without possibility of detachment.

The driving unit 7 and driven unit 8 of the link-type extractor are pivotally connected via the driven arms 84 and the claws 73. This solves the problem of uneven application force of the conventional complex extractor. However, when screwing the adjustment nut 83 to control the claws 73 to open or close, the driving unit 7 and the driven unit 8 are rotated via the thread column 81 and the nut 83. This increases the friction during rotation. Moreover, such extractor lacks any rectifying measure so that the claws 73 still cannot be truly moved in the same line. Therefore, the claws 73 tend to deflect. Accordingly, the above extractor still needs to be improved.

SUMMARY OF THE INVENTION

It is therefore a primary object of the present invention to provide an improved extractor structure in which by means of screwing a differential nut, a driving unit is operated up and down to make an activating unit open or close the claws for grasping a work piece.

It is a further object of the present invention to provide the above extractor structure in which the extension arms of the driving unit are interlaced with the fixing arms of the threaded seat and the connecting arms of the connecting seat of the activating unit. Therefore, when the connecting seat of the activating unit operates, the claws can be opened or closed without deflection.

It is still a further object of the present invention to provide the above extractor structure in which the differential nut has a thread hole. In addition, each of the driving unit and the connecting seat of the activating unit is formed with a through hole. This reduces the friction generated when the activating unit operates. Therefore, the differential nut can be screwed with least strength to easily open/close the claws.

The present invention can be best understood through the following description and accompanying drawings wherein:

DETAILED DESCRIPTION OF THE PREFERRED EMBODIMENTS

Figure 1:
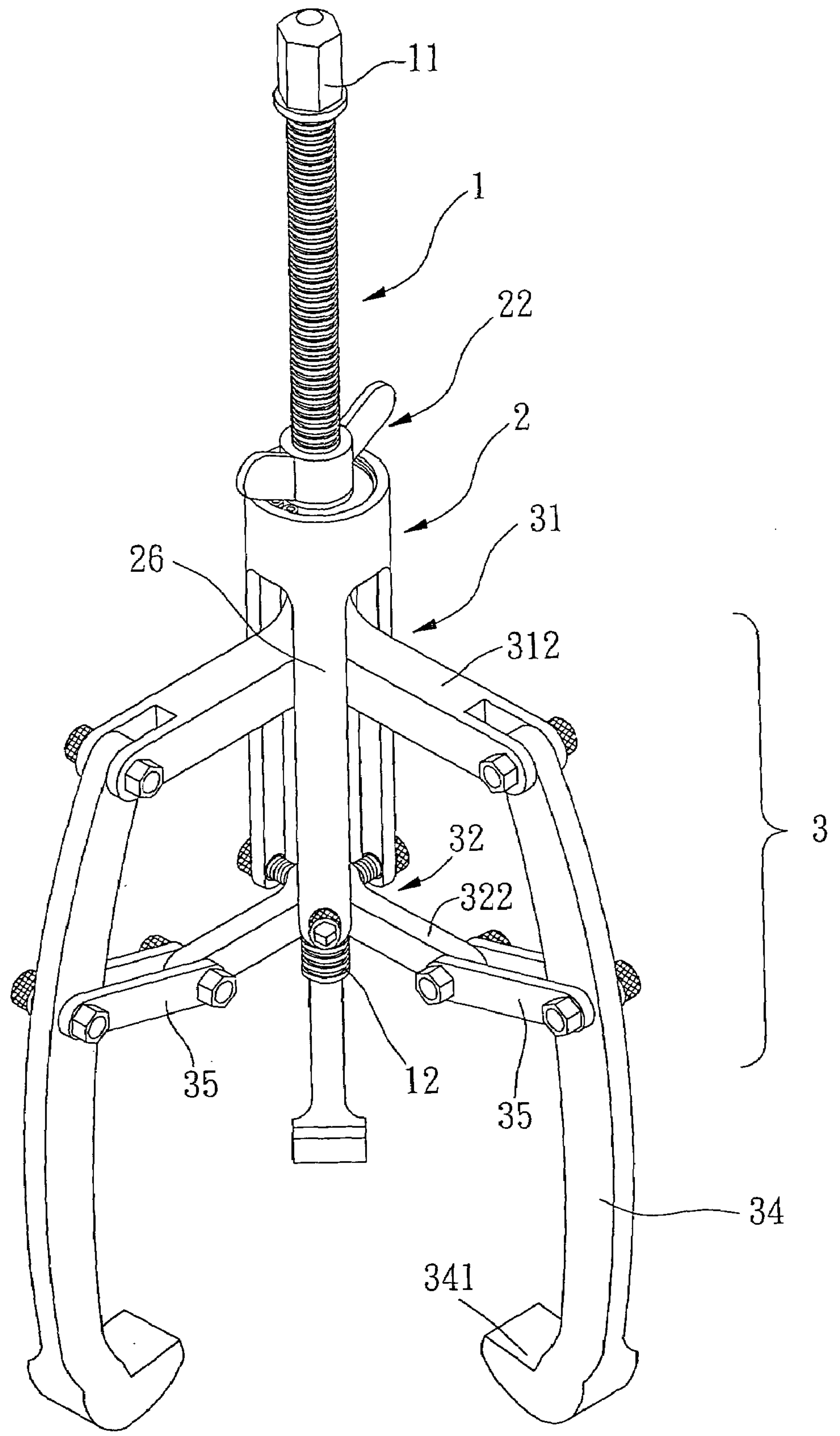
FIG. 1 is a perspective assembled view of the present invention.
Figure 2:
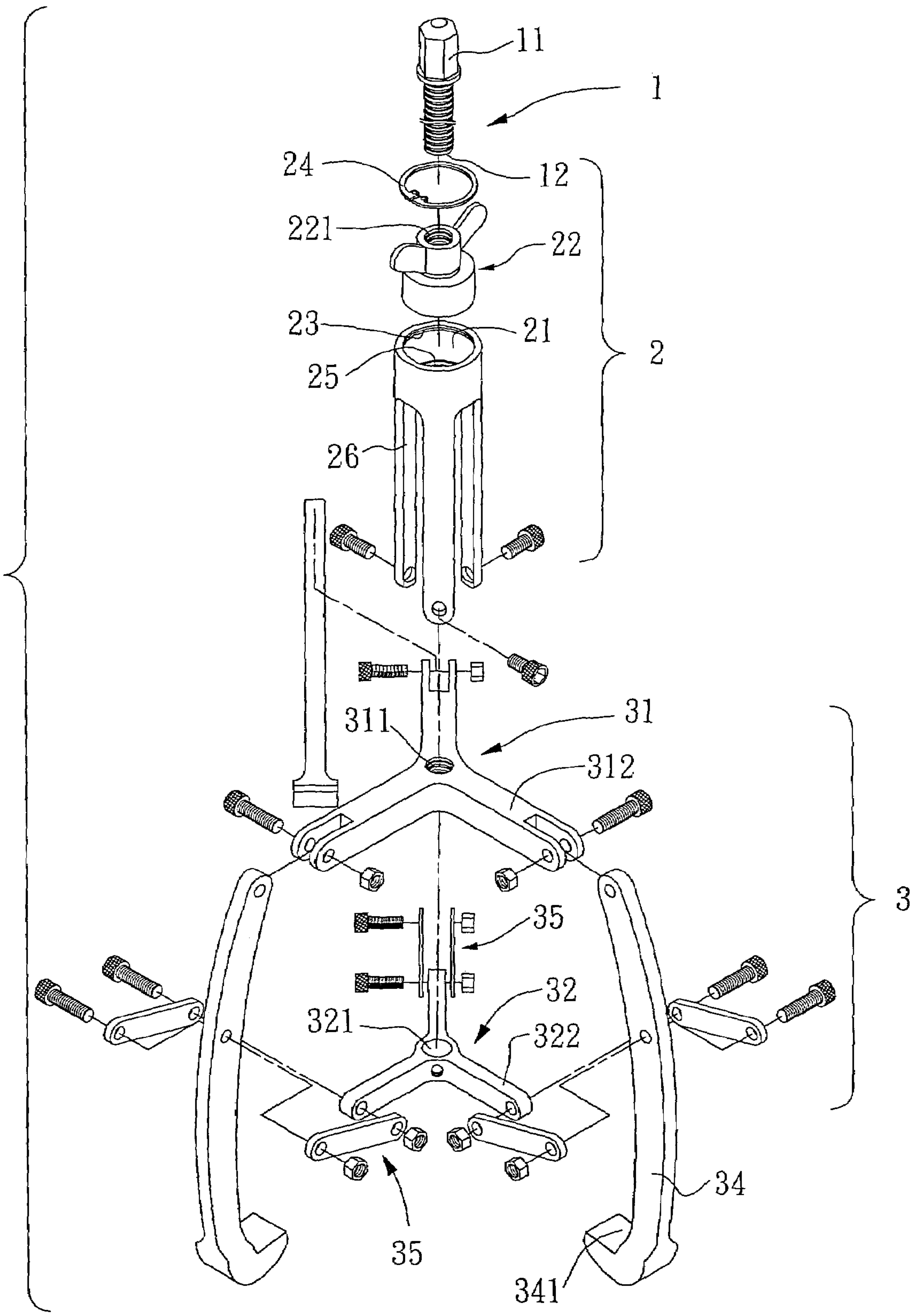
FIG. 2 is a perspective exploded view of the thread rod, the driving unit and activating unit of the present invention.

Please refer to FIGS. 1 and 2. The extractor structure of the present invention includes a thread rod 1, a driving unit 2 and an activating unit 3. One end of the thread rod 1 is formed with a coupling section 11 which is drivable by a driving means or manually drivable. The other end of the thread rod 1 has a push section 12 for pushing a work piece.

The driving unit 2 has a receptacle 21 in which a differential nut 22 is rotatably disposed. An upper rim of the receptacle 21 is formed with an annular groove 23 in which a C-shaped retainer ring 24 is inlaid. The driving unit 2 is formed with an internal through hole 25 and the differential nut 22 is formed with a thread hole 221. The thread rod 1 is screwed through the thread hole 221 of the nut 22 and the through hole 25 of the driving unit 2. The driving unit 2 has several extension arms 26 extending from one end of the driving unit 2 distal from the differential nut 22.

The activating unit 3 is disposed under the driving unit 2. The activating unit 3 includes a threaded seat 31 and a connecting seat 32 positioned under the threaded seat 31. The threaded seat 31 is formed with a central thread hole 311 and the connecting seat 32 is formed with a central through hole 321. The thread rod 1 is screwed through the thread hole 311 of the threaded seat 31 and the through hole 321 of the connecting seat 32. The threaded seat 31 has several fixing arms 312 outward extending from the center of the threaded seat 31. The connecting seat 32 has several connecting arms 322 outward extending from the center of the connecting seat 32. The fixing arms 312 of the threaded seat 31 and the extension arms 26 of the driving unit 2 are interlaced with each other. The extension arms 26 are pivotally connected with the connecting seat 32. In this embodiment, the extension arms 26 are locked with the connecting seat 32 by screws. The length of the fixing arms 312 of the threaded seat 31 is larger than the length of the connecting arms 322 of the connecting seat 32. The outer end of each fixing arm 312 of the threaded seat 31 is pivotally connected with a claw 34. In this embodiment, the outer end of each fixing arm 312 of the threaded seat 31 is locked with one end of the claw 34 by a screw. An activating arm 35 is pivotally connected with a middle section of the claw 34. In this embodiment, the activating arm 35 is composed of two slats. In addition, the activating arm 35 is pivotally connected with the connecting arm 322 of the connecting seat 32. One end of the claw 34 distal from the activating arm 35 is formed with a hook section 341.

Figure 3:
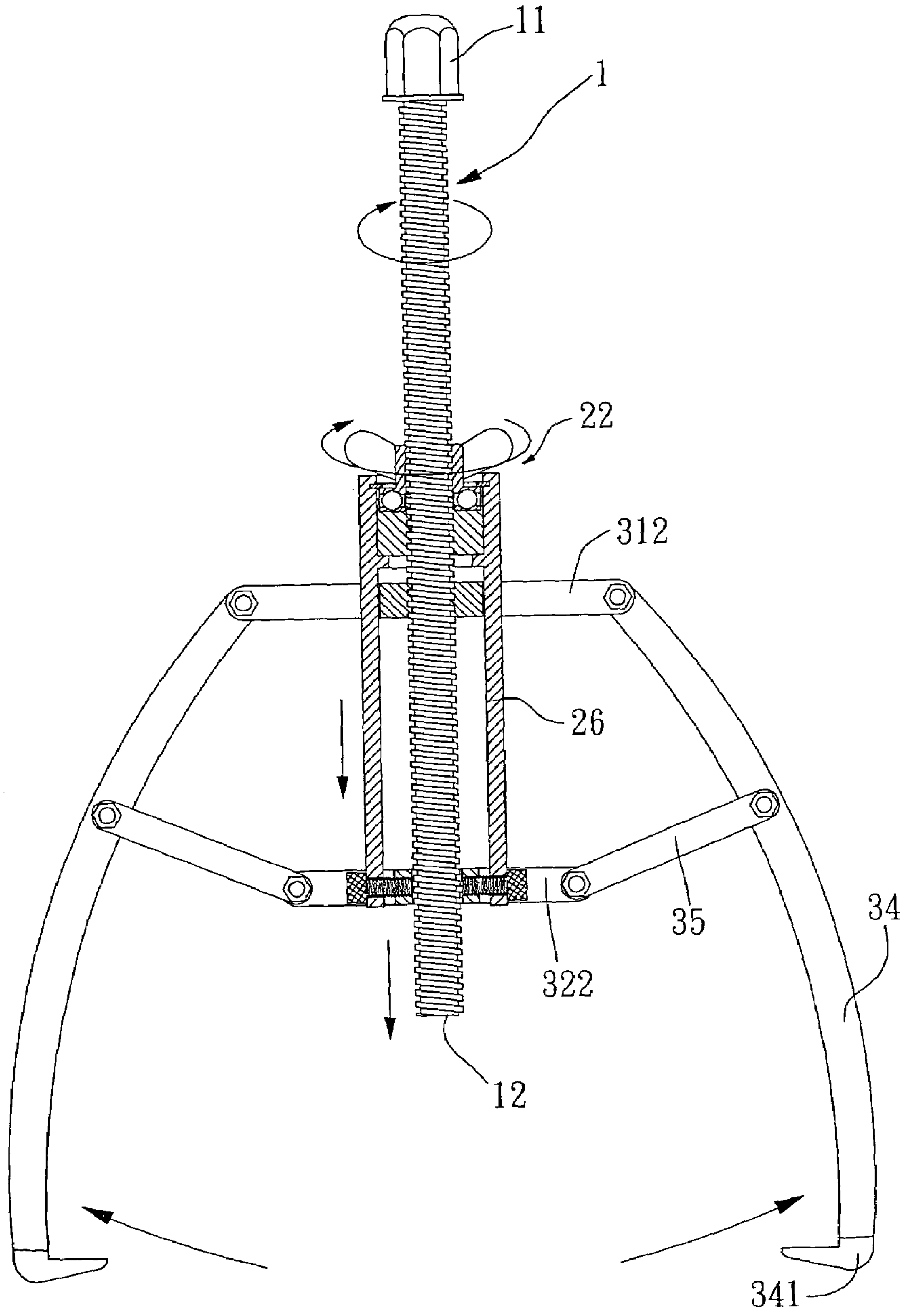
FIG. 3 is a sectional view showing the use of the present invention in an opened state.
Figure 4:
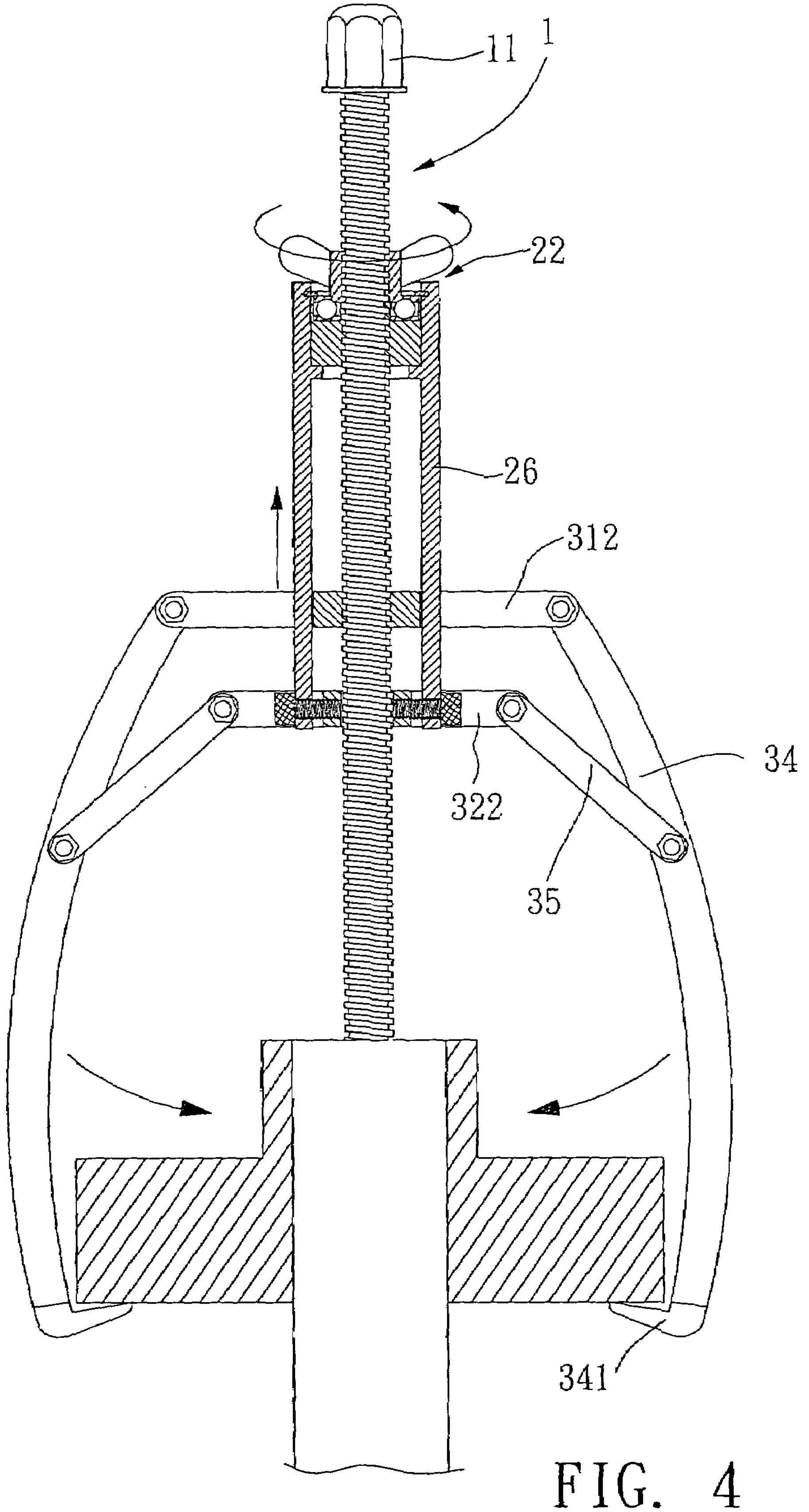
FIG. 4 is a sectional view showing that the present invention is used to grasp a work piece.
Figure 5:
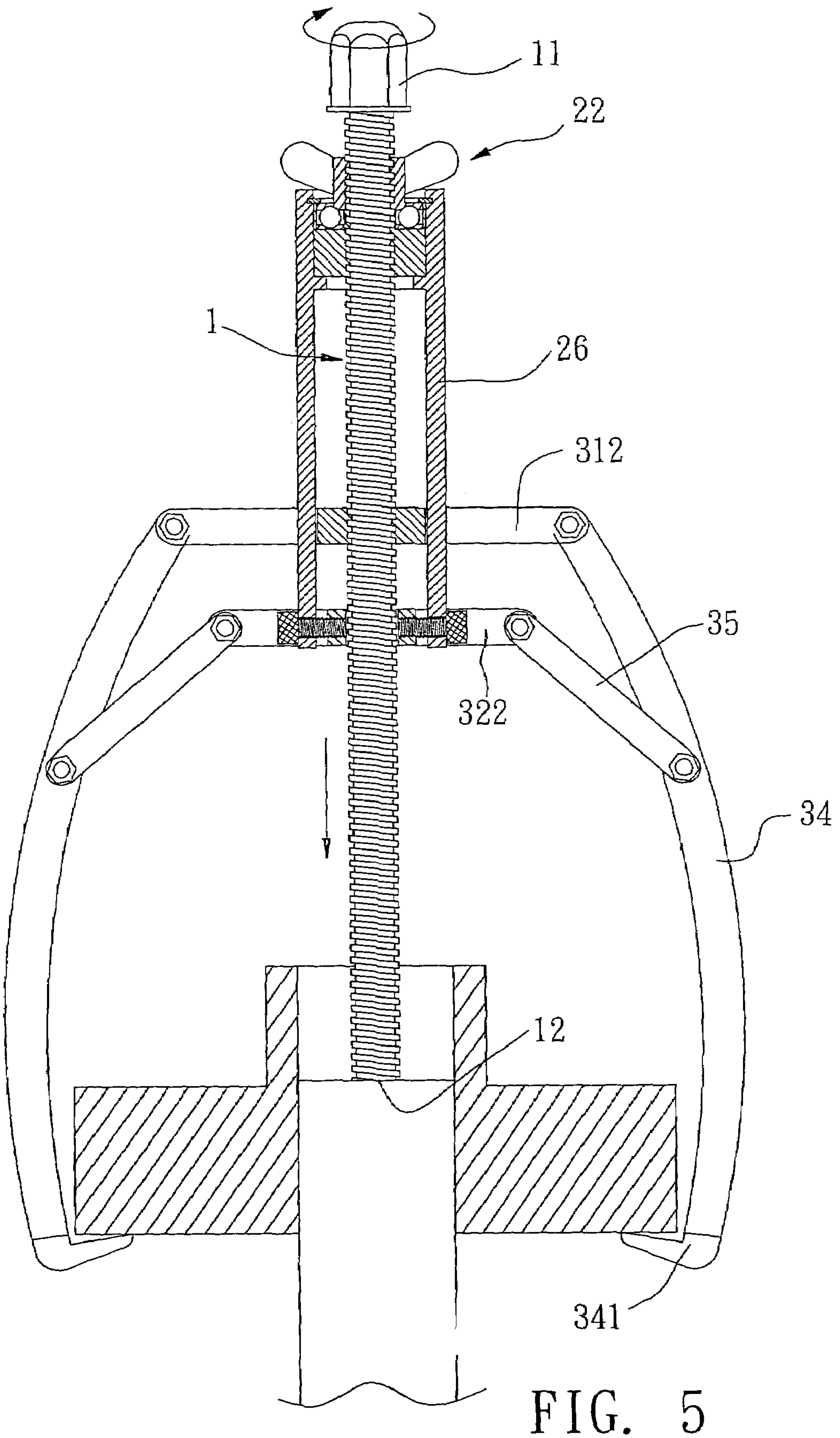
FIG. 5 is a sectional view showing that the present invention pushes and retreats the work piece.
Figure 6:
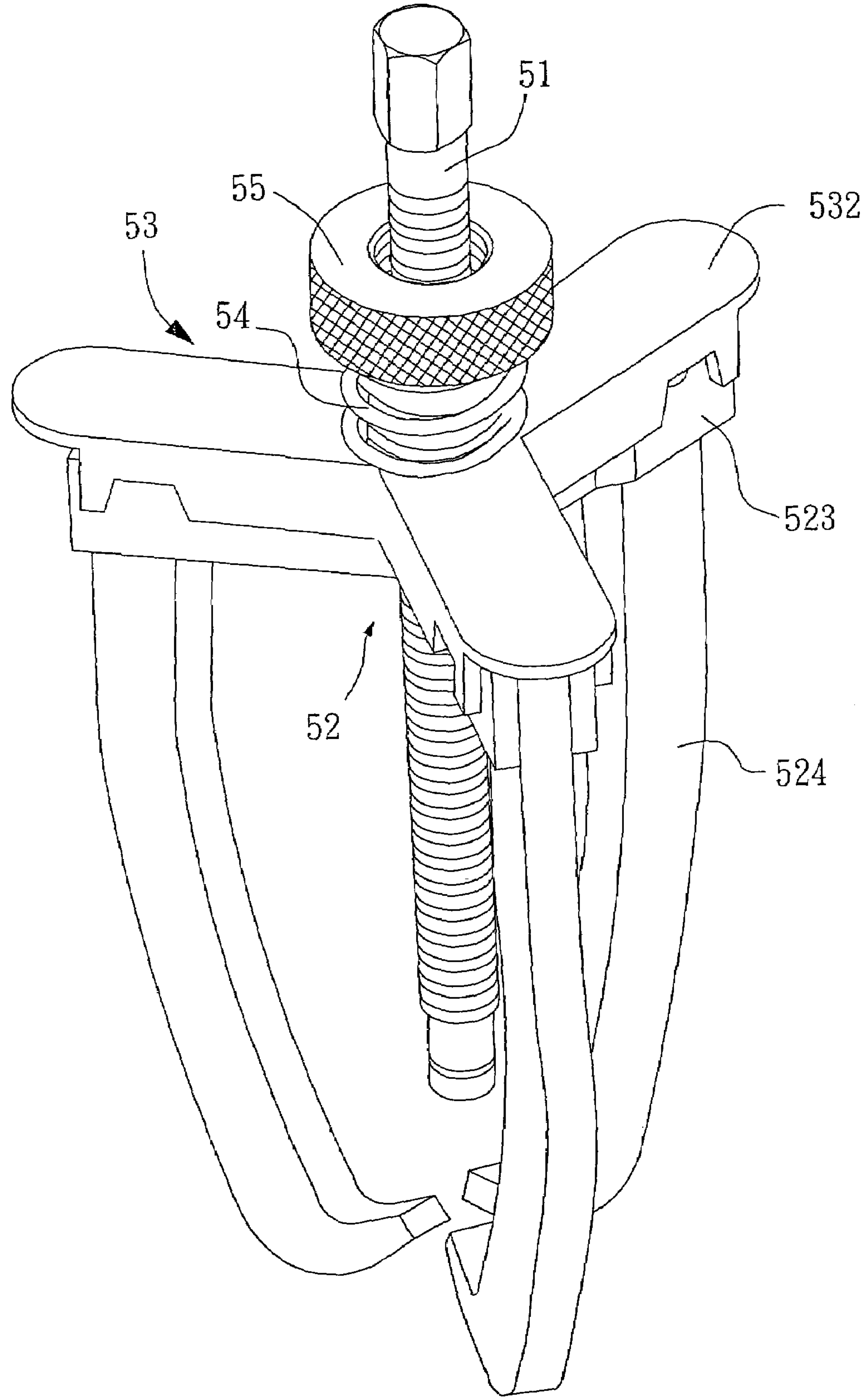
FIG. 6 PRIOR ART
FIG. 6 is a perspective view of a conventional extractor.
Figure 7:
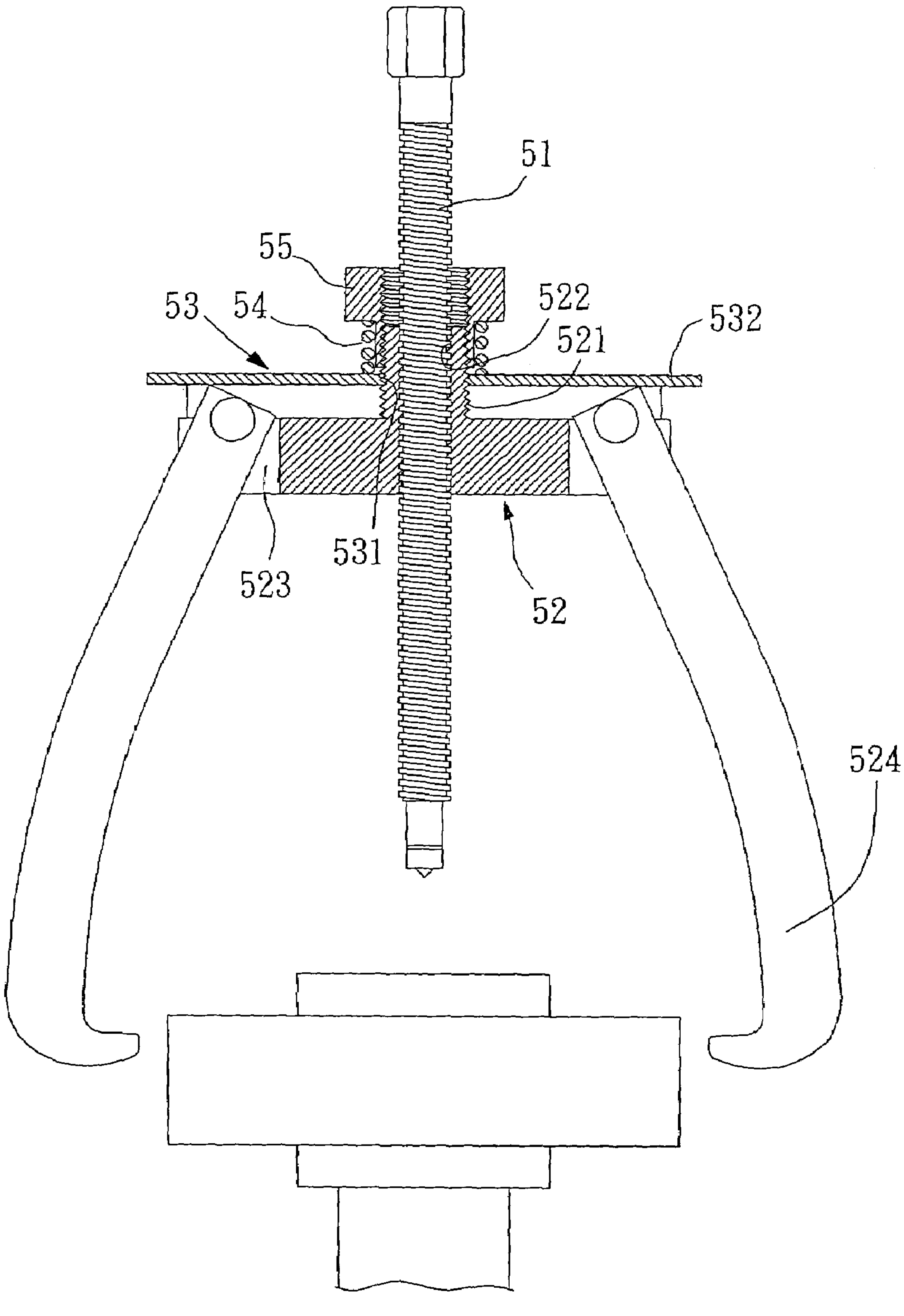
FIG. 7 PRIOR ART
FIG. 7 is a sectional assembled view of the conventional extractor.
Figure 8:
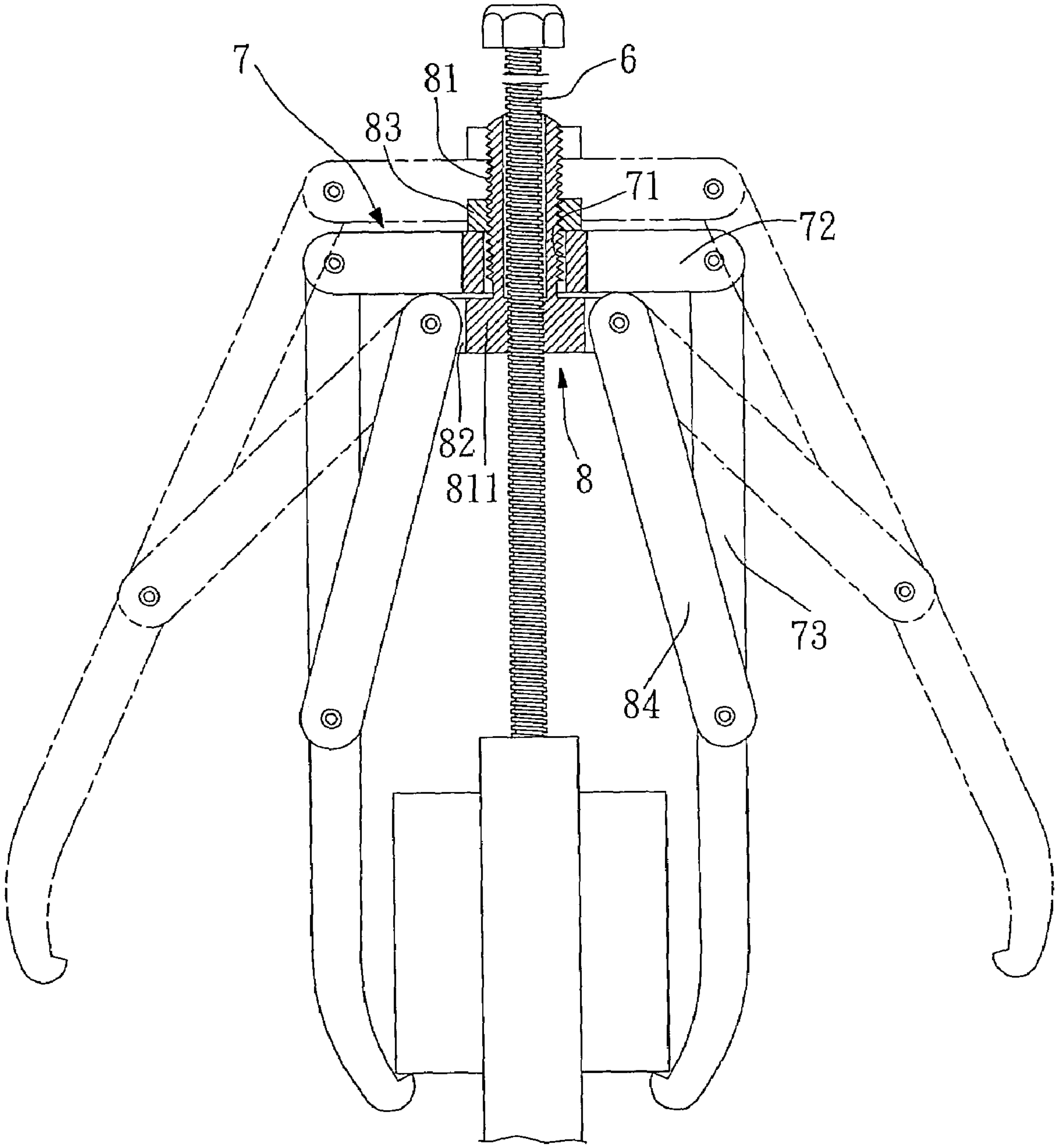
FIG. 8 PRIOR ART
FIG. 8 is a perspective view of another type of conventional extractor.

Referring to FIGS. 3 to 5, in use of the present invention, a user can respectively hold the outer circumference of the receptacle 21 of the driving unit 2 and the thread rod 1 with both hands. The differential nut 22 is first screwed to open the claws 34 to a certain width. The C-shaped retainer ring 24 is inlaid in the annular groove 23 of the receptacle 21 and the extension arms 26 are pivotally connected with the connecting seat 32. Therefore, the driving unit 2 can drive the activating unit 3 to move. Then, the thread rod 1 is adjusted and aligned with the central axis of a work piece. The differential nut 22 is again screwed to close the claws 34 to a certain width for truly grasping the work piece. Then, by means of driving the coupling section 11, the thread rod 1 pushes the work piece to retreat the extractor, whereby the work piece can be detached from a shaft section engaged with the work piece.

When removing the extractor, the differential nut 22 is first screwed to open the claws 34 to a certain width. Then the thread rod 1 is adjusted to separate from the central axis of the work piece. Thereafter, the extractor can be easily removed.

The extension arms 26 of the driving unit 2 are interlaced with the fixing arms 312 of the threaded seat 31 and the connecting arms 322 of the connecting seat 32. The extension arms 26 are pivotally connected with the connecting seat 32. Therefore, when the connecting seat 32 of the activating unit 3 operates, the claws 34 can be opened or closed without deflection.

Furthermore, the differential nut 22 has a thread hole 221 and the driving unit 2 is formed with an internal through hole 25 in the receptacle 21. This can reduce the friction generated when the thread rod 1 or the activating unit 3 operates. Therefore, the differential nut 22 can be easily turned with least strength to adjustably open or close the claws 34 to a suitable width.

The above embodiments are only used to illustrate the present invention, not intended to limit the scope thereof. Many modifications of the above embodiments can be made without departing from the spirit of the present invention.

What is claimed is:

1. An extractor structure comprising a thread rod, a driving unit and an activating unit, wherein:

one end of the thread rod is formed with a coupling section;

the driving unit has a receptacle in which a differential nut is rotatably disposed, the driving unit being formed with an internal through hole, the differential nut being formed with a thread hole, the thread rod being screwed through the thread hole of the nut and the through hole of the driving unit, the driving unit having several extension arms extending from one end of the driving unit distal from the differential nut; and the activating unit is disposed under the driving unit, the activating unit including a threaded seat and a connecting seat positioned under the threaded seat, the threaded seat being formed with a central thread hole, the connecting seat being formed with a central through hole, the thread rod being screwed through the thread hole of the threaded seat and the through hole of the connecting seat, the threaded seat having several fixing arms outward extending from the center of the threaded seat, the connecting seat having several connecting arms outward extending from the center of the connecting seat, the fixing arms of the threaded seat and the extension arms of the driving unit being interlaced with each other, the extension arms being pivotally connected with the connecting seat, the fixing arms of the threaded seat having a length larger than a length of the connecting arms of the connecting seat, an outer end of each fixing arm of the threaded seat being pivotally connected with a claw, an activating arm being pivotally connected with a middle section of the claw, the activating arm being pivotally connected with the connecting arm of the connecting seat.

2. The extractor structure as claimed in claim 1, wherein one end of the thread rod has a push section for pushing a work piece.

3. The extractor structure as claimed in claim 1, wherein an upper rim of the receptacle is formed with an annular groove in which a C-shaped retainer ring is inlaid.

4. The extractor structure as claimed in claim 1, wherein the activating arm is composed of two slats.

5. The extractor structure as claimed in claim 1, wherein one end of the claw distal from the activating arm is formed with a hook section.

* * * * *